April 12, 1932.  L. G. ZESBAUGH  1,853,392
CONVEYING APPARATUS
Filed Nov. 29, 1929   3 Sheets-Sheet 1

Inventor
LAWRENCE G. ZESBAUGH
By Vael, Paul Moore
ATTORNEYS

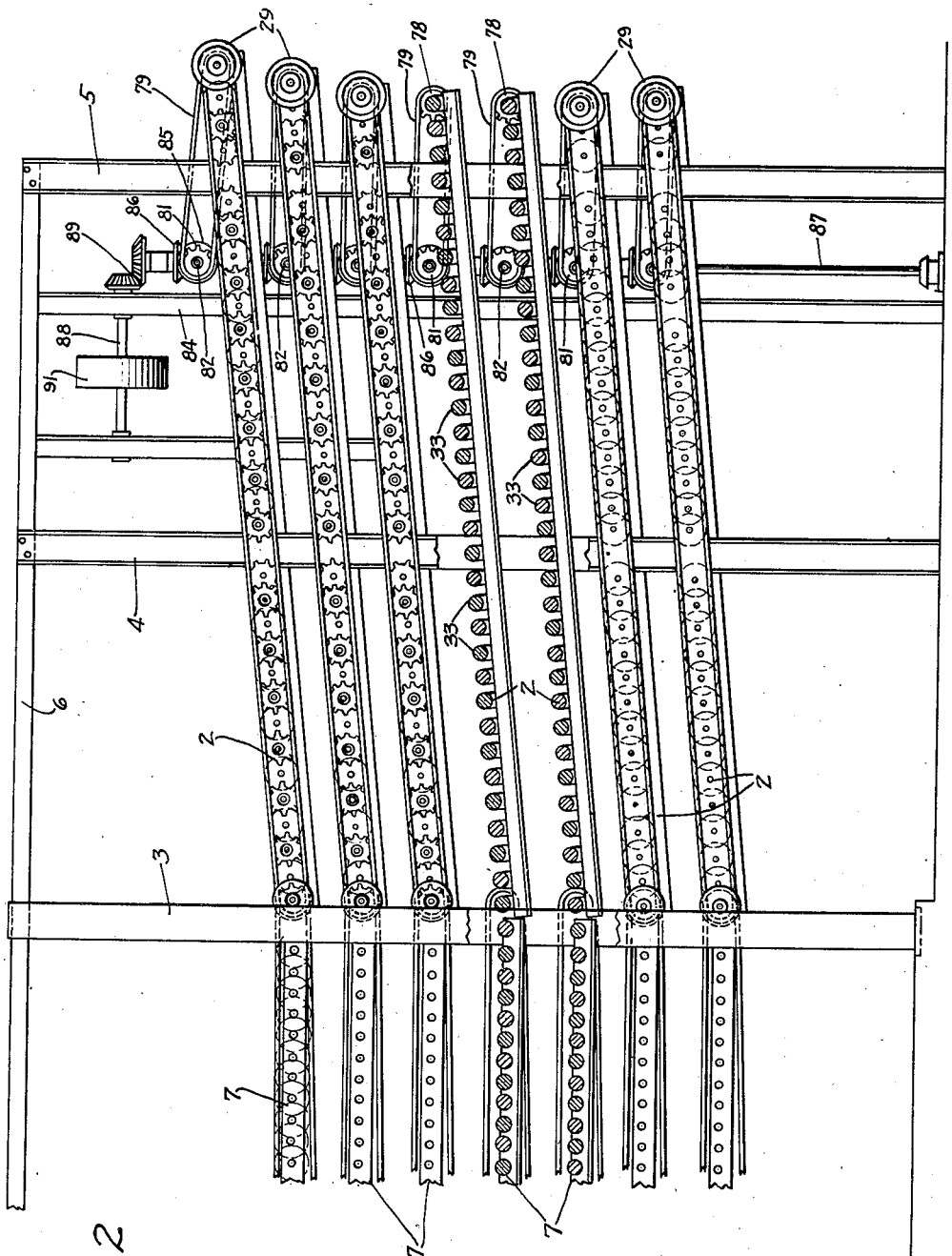

April 12, 1932.  L. G. ZESBAUGH  1,853,392
CONVEYING APPARATUS
Filed Nov. 29, 1929   3 Sheets-Sheet 3
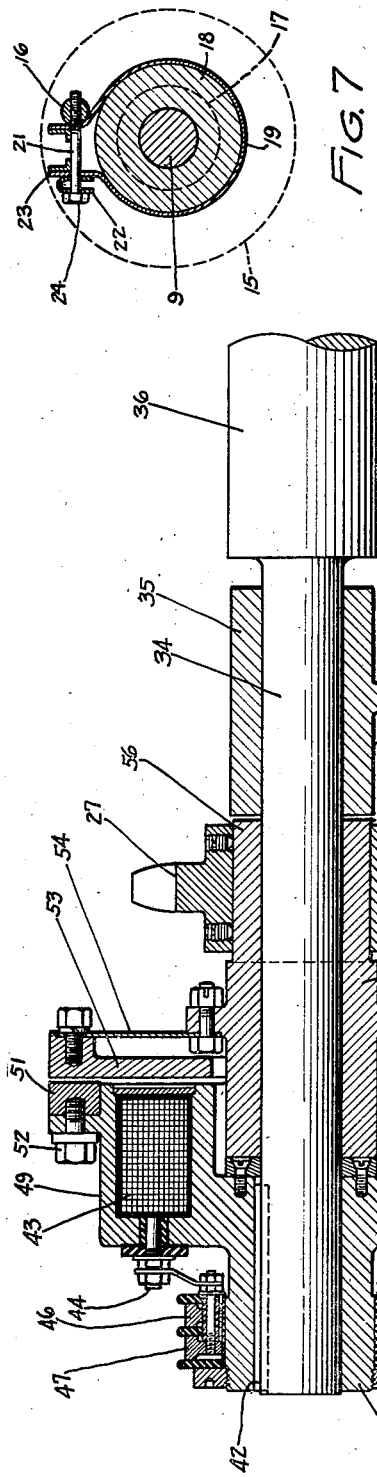
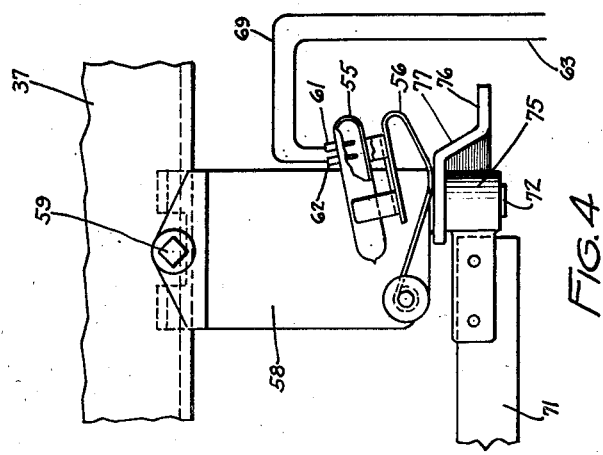
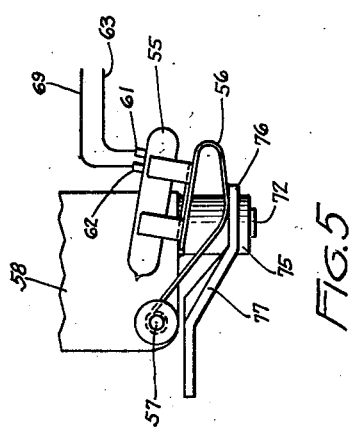
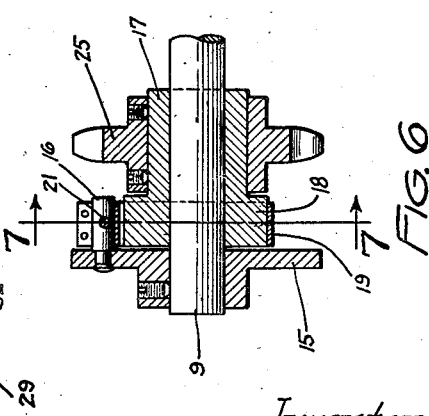
Inventor
LAWRENCE G. ZESBAUGH
By Paul Paul Moore
ATTORNEYS Patented Apr. 12, 1932

1,853,392

UNITED STATES PATENT OFFICE

LAWRENCE GEORGE ZESBAUGH, OF MINNEAPOLIS, MINNESOTA, ASSIGNOR TO THE INSULITE COMPANY, OF MINNEAPOLIS, MINNESOTA, A CORPORATION OF MINNESOTA

CONVEYING APPARATUS

Application filed November 29, 1929. Serial No. 410,517.

This invention relates to an improved conveying apparatus including a conveyer adapted to be operated at two different speeds.

An object of the invention is to provide a two-speed drive for a conveyer, one of said speeds embodying a magnetic clutch having a control means positioned to be actuated by the material traveling over the conveyer.

A further object is to provide in combination with a conveyer a mechanically operated clutch adapted to operate the conveyer at low speed and a magnetic clutch adapted to operate the conveyer at high speed.

A further object is to provide a conveying apparatus capable of handling comparatively stiff sheet-like material, which comprises two or more conveyers arranged in superposed relation and each having a two-speed drive; and the low speed drive of each conveyer including a mechanically operated clutch connected with a suitable source of power, and the high speed drive including a magnetic clutch adapted to normally operate the conveyer at high speed, said magnetic clutch having a control means positioned to be actuated by the material traveling over the conveyer, whereby said magnetic clutch may be rendered inoperative when a sheet of material is delivered onto its complemental conveyer.

Other objects reside in the operative connection between the two clutches of each conveyer; in the constructional details of the mechanically operated clutches; and in the construction of the magnetic clutches and the manner of mounting and supporting each such clutch upon a single shaft, which assures perfect alinement of the two clutch members.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings:

Figure 2 is an elevational view showing a conveying apparatus including a plurality of conveyers, each provided with a two-speed drive;

Figure 3 is an enlarged detail sectional view on the line 3—3 of Figure 1, showing the general construction of the magnetic clutch;

Figure 4 is an enlarged detail view showing a switch for controlling the operation of the magnetic clutch;

Figure 5 is a view similar to Figure 4, showing the switch in circuit-closing position;

Figure 6 is an enlarged detail sectional view on the line 6—6 of Figure 1; and

Figure 7 is a detail sectional view on the line 7—7 of Figure 6.

Figure 1:
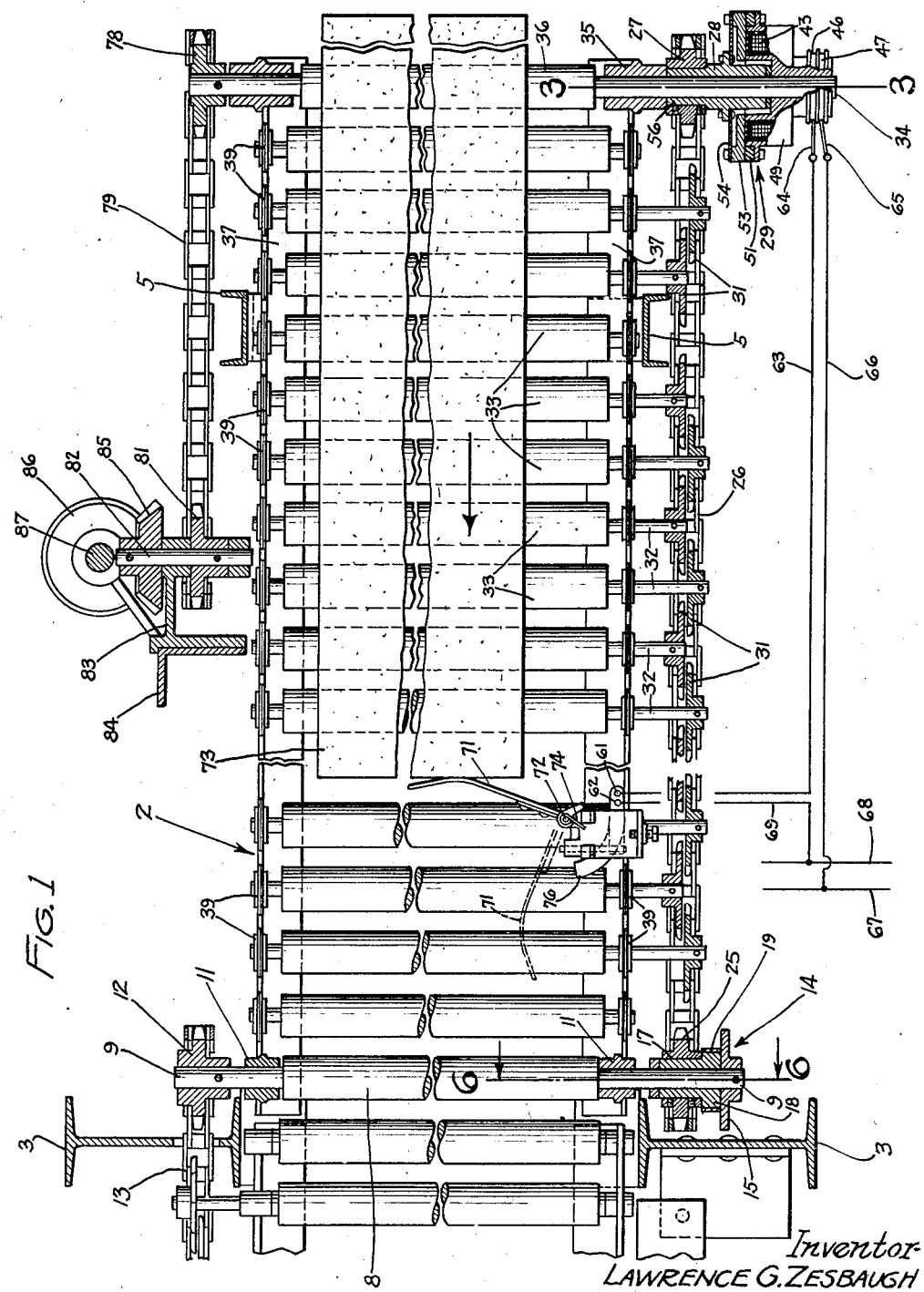
Figure 1 is a plan view showing a conveyer with the invention applied thereto.

In the selected embodiment of the invention here shown, there is illustrated in Figure 2, a plurality of feeding conveyers 2 arranged one above the other and supported in a structural frame including uprights 3, 4, and 5, and longitudinal members 6. The conveyers 2 are shown operatively connected with a plurality of conveyers 7 which may lead to any suitable destination.

Each feeding conveyer is here shown comprising a roll 8 located at the discharge end thereof and supported upon a shaft 9 which is mounted in suitable bearings 11 secured to the uprights 3. A sprocket wheel 12 is secured to one end of the shaft 9 and may be driven from a chain 13 operatively connected with a suitable source of power, not shown.

Mechanically operated clutch

The opposite end of the shaft 9 has a mechanically operated clutch 14 mounted thereon which preferably is of the friction type, and comprises a disk 15 secured to the shaft 9 and having a pin 16 secured therein as shown in Figure 6. A sleeve 17 is loosely mounted upon the shaft 9 and has an enlarged cylindrical portion 18 positioned adjacent to the disk 15 and encircled by a friction band 19, having its end portions supported upon a bolt or screw 21 adjustably secured in the stud 16, as shown in Figure 7. A suitable spring member 22 is interposed between the end portion 23 of the band 19 and the head 24 of the bolt 21 and constantly urges the end portion 23 of the band in a direction towards the stud 16.

A sprocket wheel 25 is secured to the sleeve 17 for rotation therewith and has a chain 26 connecting it with a sprocket 27 mounted upon a sleeve 28 of a magnetic clutch 29 (see Figure 1). The chain 26 engages sprockets 31 terminally secured to the shaft extensions 32 of the rolls 33 of the feeding conveyers 2. The friction band 19 is so arranged with respect to the direction of rotation of the disk 15 that when the magnetic clutch 29 is inoperative, the chain 26 will be driven from the sprocket 25 because of the friction band 19 frictionally engaging the hub 18 of the sleeve 17 and thereby causing it to rotate synchronously therewith, as will readily be understood by reference to Figure 7.

Magnetic clutch

The magnetic clutch 29 for operating each conveyer 2 at high speed is mounted upon one end of a shaft 34 supported in suitable bearings 35 and having a roll 36 secured thereto, as shown in Figures 1 and 3. The bearings 35 are mounted on the side rails 37 of the conveyer. The other rolls 33 of the conveyer 2 are supported on the side rails 37 by suitable bearings 39.

The clutch 29 comprises a member 41 secured to the end of the shaft 34 by such means as a key 42. This member has an annular recess 40 adapted to receive a suitable coil or winding 43 having terminals 44 and 45. The terminal 44 is shown electrically connected to a collector ring 47 and the terminal 45 to a collector ring 46. These collector rings are of ordinary construction and are suitably mounted upon the hub of the member 41 in insulation thereto. The rings are also insulated from one another by such means as insulating disks 48. The outer portion 49 of the clutch member 41 has a suitable friction ring 51 secured thereto by such means as bolts 52. This ring is adapted to engage a disk 53 resiliently mounted upon the hub 28 by means of a resilient member 54, best shown in Figure 3. The hub 28 is loosely mounted upon the shaft 34 and has a reduced extension 56 upon which the sprocket wheel 27 is secured. This sprocket supports one end of the chain 26 as shown in Figure 1.

Magnetic clutch control

The means for controlling the operation of the magnetic clutch is shown in Figures 1, 4, and 5, and comprises a suitable switch here shown as of the mercury type, comprising a mercury tube 55 supported upon a member 56 pivotally supported upon a pin 57 secured to a bracket 58, which in turn is secured to one of the side rails 37 of the conveyer by suitable means such as a set screw 59, shown in Figure 4. The mercury tube 55 is provided with the usual contacts 61 and 62, adapted to be bridged by the mercury contained within the tube. A wire 63 connects the contact 61 with a brush 64 arranged to contact with the collector ring 46. A similar brush 65 electrically contacts with the collector ring 47 and has a wire 66 connecting it with a conductor 67 of a supply circuit. The other conductor 68 of the supply circuit has a wire 69 connecting it with the contact 62 of the mercury tube.

The means provided for operating the switch comprises a finger 71 pivotally supported upon a pin 72 and positioned to be engaged by the material 73 as the latter travels over the conveyer. (See Figure 1). The finger 71 is normally retained in the full line position shown in Figure 1 by means of a suitable torsion spring indicated at 74. The finger 71 has a hub 75 bored to receive the pin 72, as shown in Figure 4. A quadrant 76 is shown secured to the hub 75 and has an inclined surface 77 adapted to engage the member 56 and swing it upwardly from the position shown in Figure 5 to that shown in Figure 4, when the finger 71 is moved from the full to the dotted line position shown in Figure 1. When the finger 71 is in the full line position shown, the mercury tube 55 will be positioned as shown in Figure 5, thereby causing the mercury contained therein to bridge the contacts 61 and 62 in the usual manner, and thus electrically connect the winding 43 of the magnetic clutch with the supply circuit 67—68. When the winding 43 of the clutch thus becomes energized, the disk 53 will be moved into frictional driving engagement with the friction ring 51 by the magnetic influence of the coil 43, thereby causing the hub 28 to rotate simultaneously with the clutch member 41 with the result that the sprocket 27 will be rotated at a relatively higher speed which will cause the rolls 33 of the conveyer to be rotated at high speed. When the conveyer rolls 33 are rotating at high speed, the mechanically operated clutch 14 will be inoperative as a result of the clutch sleeve 17 thereof rotating at a relatively higher speed than the disk 15. When the sleeve 17 is thus rotating at a higher speed than the disk 15, the friction band 19 will be out of frictional engagement with the hub 18 of the sleeve, as will readily be understood by reference to Figure 7.

Drive for magnetic clutch

A means for driving the magnetic clutch is shown in Figures 1 and 2, and comprises a sprocket 78 secured to the opposite end of the shaft 34 and having a chain 79 connecting it with a sprocket 81 secured to a stub shaft 82 supported in suitable bearings provided on a bracket 83, shown secured to an upright frame member 84. The shaft 82 has a pair of mitre gears 85 and 86 operatively connecting it with an upright drive shaft 87 here shown driven from a shaft 88 by a pair of bevel gears 89. A pulley 91 is mounted on the shaft 88 which may be connected with a suitable source of power, not shown.

Operation

In the operation of this novel two-speed conveying apparatus, the material to be conveyed is delivered to the feeding conveyer 2 from the right hand side of the apparatus, when viewed as shown in Figure 1. As the material, which may be in the form of sheets or boards, travels over the conveyer 2 in the direction indicated by the arrow in Figure 1, the leading end thereof will engage the finger 71 of the control switch for the magnetic clutch, and swing it from the full to the dotted line position shown, whereupon the switch will be moved into circuit-opening position, as indicated in Figure 4, thereby causing the magnetic clutch to be rendered inoperative with the result that the drive chain 26 for the conveyer rolls 33 will drop from high to low speed, which speed is controlled by the operation of the mechanically operated clutch 14. As soon as the tail end of the board or sheet passes the switch finger 71, the spring 74 will return the finger to its normal operative position, shown in full lines in Figure 1, whereupon the switch will be moved into circuit-closing position and cause the magnetic clutch to become operative with the result that the drive chain 26 for the conveyer rolls 33 will again be operated at high speed. It will thus be seen that the operation of the magnetic clutch is automatically controlled by the material moving into and out of engagement with the switch finger.

In the present application, the various feeding conveyers shown in Figure 2, and also their two-speed drives, are of like construction, and I have therefore thought it necessary to describe in detail, but one such conveyer and its drive.

I claim as my invention:

1. In an apparatus of the class described, a conveyer provided at one end with a low speed drive shaft and at its opposite end with a high speed drive shaft, a clutch mounted upon the low speed shaft and including an element fixed thereto and a member mounted for relative rotation thereon, a sprocket secured to said member, means for operatively connecting said element with said member whereby they may rotate as a unit, a clutch mounted upon the high speed shaft and including a part secured thereto and a member loosely mounted thereon, a sprocket secured to said loosely mounted member, means for operatively connecting said part to said loosely mounted member whereby they may rotate as a unit and cause the conveyer to operate at high speed, and a chain operatively connecting together said clutch sprockets.

2. The combination with a conveyer, of high and low speed drives therefor, means operatively connecting together said drives and also operatively connecting said drives with the conveyer, said high speed drive being normally effective to drive said conveyer at high speed whereby the connection between said drives will permit said low speed drive to become ineffective, and means adapted to be actuated by articles traveling over the conveyer to cause said high speed drive to become ineffective and, at the same time, causing said low speed drive to become effective to drive the conveyer at low speed.

3. The combination with a conveyer, of a high speed drive shaft mounted at one end of the conveyer and a low speed drive shaft mounted at the opposite end thereof, means operatively connecting together said drive shafts and also operatively connecting said shafts with said conveyer, a clutch on said high speed shaft normally operative to drive the conveyer at high speed, a clutch on the low speed drive shaft adapted to be inoperative when the clutch on said high speed shaft is operated, and means adapted to be actuated by articles traveling over said conveyer to render the clutch on said high speed shaft inoperative, whereby the clutch on said low speed shaft will be rendered operative to drive the conveyer at low speed.

4. The combination with a conveyer comprising a plurality of rollers each provided with a sprocket, of a high speed drive shaft mounted at one end of the conveyer and a low speed drive shaft mounted at the opposite end thereof, a chain operatively connecting together said drive shafts and also operatively connecting said shafts with said conveyer roller sprockets, a clutch on said high speed shaft normally operative to drive the conveyer at high speed, a clutch on the low speed drive shaft adapted to be inoperative when the clutch on said high speed shaft is operated, and means connected with the high speed clutch and adapted to be actuated by articles traveling over said conveyer to render said high speed clutch inoperative whereby the clutch on said low speed shaft will be rendered operative to drive the conveyer at low speed.

5. The combination with a power driven conveyer, of a high speed drive operatively connected therewith and provided with a control member positioned to be engaged by articles traveling over the conveyer, said control member normally being positioned to cause said clutch to operate the conveyer at high speed, a low speed clutch also operatively connected with the conveyer and having an operative connection with said high speed clutch, whereby when the high speed clutch is operating the conveyer, said low speed clutch will be inoperative, and the operative connection between said clutches being such that when the high speed clutch is rendered inoperative by an article engaging said control member, said slow speed clutch will operate the conveyer at low speed.

6. The combination with a power driven conveyer provided with high and low speed drives, said high speed drive normally operating the conveyer at high speed, a control member for said high speed drive mounted to be engaged by articles traveling over the conveyer, means operatively connecting together said drives whereby when one drive is operating, the other will be ineffective, said control member being so positioned that when engaged by an article traveling over the conveyer at high speed, said member will cause the high speed drive to become ineffective whereby the low speed drive will operate the conveyer during the period that the article is traveling over the conveyer and is engaged with said control member, and said member being adapted to return to its normal position when the article moves out of engagement therewith, whereby the high speed drive will again be rendered effective and the low speed drive ineffective.

7. In combination, a conveyer adapted to receive articles traveling at a comparatively high speed and deliver them to a receiving means traveling at a relatively lower speed, said conveyer comprising high and low speed drives, said high speed drive normally operating the conveyer at a speed commensurate with the travel of the articles when received, and said low speed drive being operatively connected with said high speed drive and adapted to operate the conveyer at a speed corresponding substantially to the speed of said receiving means, when the high speed drive is inoperative to drive the conveyer, and a control member for said high speed drive positioned to be engaged by articles traveling over the conveyer, whereby when an article has been delivered onto said conveyer, said control member will be actuated to render said high speed drive ineffective and cause said low speed drive to operate the conveyer at a speed commensurate to the speed of said receiving means.

In witness whereof, I have hereunto set my hand this 22d day of November, 1929.

LAWRENCE G. ZESBAUGH.